United States Patent
Moore

(10) Patent No.: US 10,260,430 B2
(45) Date of Patent: Apr. 16, 2019

(54) GDCI COLD START AND CATALYST LIGHT OFF

(71) Applicant: DELPHI TECHNOLOGIES IP LIMITED, St. Michael (BB)

(72) Inventor: Wayne R. Moore, Goodrich, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 76 days.

(21) Appl. No.: 15/212,856

(22) Filed: Jul. 18, 2016

(65) Prior Publication Data

US 2018/0016993 A1  Jan. 18, 2018

(51) Int. Cl.

| | |
|---|---|
| F01N 3/00 | (2006.01) |
| F02D 13/02 | (2006.01) |
| F01N 3/20 | (2006.01) |
| F02B 25/14 | (2006.01) |
| F02D 41/14 | (2006.01) |
| F02D 41/02 | (2006.01) |
| F02F 1/42 | (2006.01) |
| F01N 13/10 | (2010.01) |

(52) U.S. Cl.
CPC ....... *F02D 13/0219* (2013.01); *F01N 3/2013* (2013.01); *F01N 13/10* (2013.01); *F02B 25/145* (2013.01); *F02D 41/024* (2013.01); *F02D 41/1446* (2013.01); *F02D 41/1447* (2013.01); *F02F 1/4264* (2013.01)

(58) Field of Classification Search
USPC ................... 60/274, 278, 285, 286, 295, 97;
123/406.48, 406.55, 406.58, 406.61,
123/568.11, 568.13, 168.14, 568.15,
123/568.19
See application file for complete search history.

(56) References Cited

U.S. PATENT DOCUMENTS

| | | | | |
|---|---|---|---|---|
| 5,233,831 | A * | 8/1993 | Hitomi | F01N 3/2006 123/179.18 |
| 6,626,164 | B2 * | 9/2003 | Hitomi | F01L 1/34 123/568.14 |
| 8,534,261 | B2 * | 9/2013 | Hatamura | F01L 13/0026 123/299 |
| 2002/0014072 | A1 * | 2/2002 | Nakagawa | F01N 3/2006 60/285 |
| 2005/0224045 | A1 * | 10/2005 | Kuzuyama | F02D 13/0203 123/305 |
| 2009/0094963 | A1 * | 4/2009 | Mizoguchi | F01N 3/101 60/286 |
| 2013/0008416 | A1 * | 1/2013 | Nagatsu | F02D 13/0265 123/568.11 |
| 2013/0213349 | A1 * | 8/2013 | Sellnau | F02B 23/101 123/295 |

\* cited by examiner

*Primary Examiner* — Binh Q Tran
(74) *Attorney, Agent, or Firm* — Joshua M. Haines

(57) ABSTRACT

A GDCI engine control system includes a heated catalyst in an engine exhaust port that is in close proximity to a combustion chamber and is used to heat rebreathed exhaust gases. The engine more quickly reaches operating temperatures, and emissions are reduced during cold running.

17 Claims, 4 Drawing Sheets

GDCI COLD START AND CATALYST LIGHT OFF

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND

This disclosure relates to an engine control system used during cold start of a Gasoline Direct-Injection Compression-Ignition (GDCI) engine.

Operation of a GDCI engine can be challenging due to the kinetically driven nature of the combustion process. Initiating autoignition requires sufficient operating pressure and temperature within the combustion chamber. Although the intake manifold in some GDCI engines utilize electric heaters to more rapidly heat the intake air (and thus raise combustion chamber temperatures), the engine still may suffer from poor combustion efficiency and high emissions until the engine reaches operating temperatures.

Catalysts are commonly used in an engine's exhaust gas path to reduce emissions substantially at significant distances from the combustion chamber. For example, electrically heated catalysts have been used substantially downstream from the engines' exhaust manifolds to shorten catalyst "light-off" time to improve emissions when the engine is cold.

Some engines use internal exhaust gas recirculation (EGR), or "rebreath," to reduce emissions once the engine has reached operating temperatures. During rebreath the exhaust valves are opened during the intake stroke to allow some exhaust gases in the exhaust gas path to enter the combustion chamber through the exhaust port in the cylinder head. Rebreathing exhaust gases during cold start, however, has not been useful and is not employed.

SUMMARY

In one exemplary embodiment, an engine control system includes a combustion chamber configured to provide an in-cylinder combustion condition including a temperature. An exhaust port is in fluid communication with the combustion chamber. A catalyst is arranged in the exhaust port and includes an electric heater. An exhaust valve is arranged in the exhaust port. An actuator is operatively coupled to the exhaust valve and is configured to selectively control a flow of exhaust into the combustion chamber during a rebreath condition. At least one sensor is configured to detect the temperature. A controller is in communication with the sensor and the actuator. The controller is configured to provide a first command to the electric heater and a second command to the actuator to rebreath heated exhaust flowing into the combustion chamber in response to the detected temperature being below a desired temperature.

In a further embodiment of the above, a cylinder head supports the exhaust valve. The exhaust port is arranged in the cylinder head.

In a further embodiment of any of the above, there is an exhaust manifold. The exhaust port is arranged in the exhaust manifold and the catalyst is arranged in the exhaust manifold.

In a further embodiment of any of the above, the exhaust manifold is cast iron.

In a further embodiment of any of the above, the exhaust manifold is secured to the cylinder head.

In a further embodiment of any of the above, there are multiple combustion chambers that each include a corresponding exhaust port. The exhaust ports converge to a collector. The catalyst is arranged in each of the exhaust ports.

In a further embodiment of any of the above, there are multiple combustion chambers that each include a corresponding exhaust port. The exhaust ports converge to a collector. The catalyst is arranged in the collector.

In a further embodiment of any of the above, a camshaft is operatively connected to the exhaust valve to mechanically move the exhaust valve along an operating profile between a closed position and opened positions.

In a further embodiment of any of the above, the actuator includes a cam phaser coupled to the camshaft and configured to vary movement of the exhaust valve from the operating profile during the rebreath condition.

In a further embodiment of any of the above, the combustion chamber has a combustion volume. The exhaust port has an exhaust port volume that is less than or equal to the combustion volume. The catalyst is arranged in the exhaust port volume adjoining the combustion chamber.

In a further embodiment of any of the above, the temperature is measured.

In a further embodiment of any of the above, the temperature is estimated.

In another exemplary embodiment, an exhaust manifold for an internal combustion engine includes a casting that provides multiple exhaust runners that converge to a collector. A catalyst with an electric heater is arranged within the casting.

In a further embodiment of any of the above, the casting is cast iron.

In a further embodiment of any of the above, the catalyst is arranged in each of the exhaust runners.

In a further embodiment of any of the above, the catalyst is arranged in the collector.

In a further embodiment of any of the above, the casting includes at least one flange secured to a terminal end of the exhaust runners. At least one flange is secured to a cylinder head.

In another exemplary embodiment, a method of controlling an in-cylinder combustion charge air temperature includes the steps of detecting an undesirably low in-cylinder charge air temperature, heating exhaust gases in close proximity to a combustion chamber in response to the detecting step and rebreathing the heated exhaust gases into the combustion chamber to increase the in-cylinder charge air temperature.

In a further embodiment of any of the above, the detecting step is one of measuring or estimating the undesirably low in-cylinder charge air temperature.

In a further embodiment of any of the above, the combustion chamber has a combustion volume. The close proximity is arranged within an exhaust volume that is less than or equal to the combustion volume. The exhaust volume adjoins the combustion chamber. The heating step occurs within the exhaust volume.

In a further embodiment of any of the above, the heating step is performed by electrically heating a catalyst.

In a further embodiment of any of the above, the rebreathing step occurs during an intake stroke.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
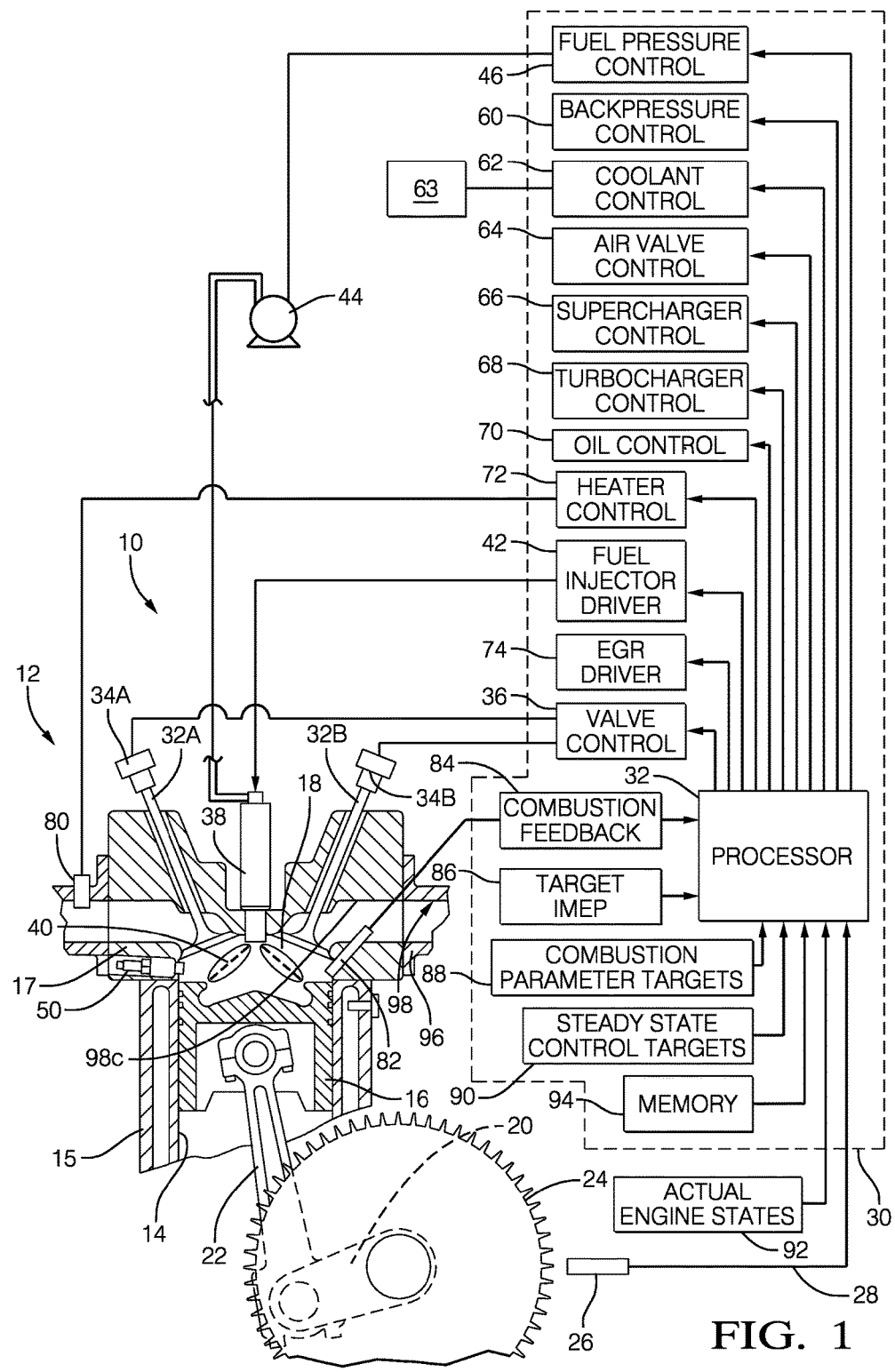
FIG. 1 is a schematic view of an embodiment of an engine control system suitable for controlling a GDCI engine.

FIG. 1 illustrates a non-limiting embodiment of an engine control system 10 suitable for controlling a Gasoline Direct-Injection Compression-Ignition (GDCI) internal combustion engine 12 for use in a vehicle, for example. GDCI differs from a Homogeneous Charge Compression Ignition (HCCI) in that the fuel/air mixture is intentionally non-homogeneous at the point of start of combustion (SOC) and employs a controlled distributed-equivalence-ratio mixture at SOC. That is, the fuel is stratified, providing discrete regions of equivalence-ratio, as disclosed in United States Publication No. 2013/0213349, entitled "High-Efficiency Internal Combustion Engine and Method for Operating Employing Full-Time Low-Temperature Partially-Premixed Compression Ignition with Low Emissions" which is incorporated herein by reference in its entirety. This distributed-equivalence ratio feature allows control of the fuel heat release timing and heat release rate as the combustion process progresses throughout the combustion chamber. Controllability of the heat release timing and rate allows GDCI to operate over essentially the entire speed and load range of the engine, which in turn may alleviate the need for mode switching and the associated efficiency losses. Although the exemplary embodiment relates to a GDCI engine, it should be understood that the disclosed engine control system and method can also be used for compression ignition diesel or HCCI engines.

While only a single cylinder is shown in FIG. 1, it will be appreciated that the disclosed system and method may be practiced independently on each cylinder of a multi-cylinder engine or commonly across multiple cylinders. The engine 12 is illustrated as having a cylinder bore 14 containing a piston 16, wherein the region above the piston 16 defines a combustion chamber 18. Linear movement of the piston 16 within the cylinder bore 14 rotationally drives a crankshaft 20 via a connecting rod 22.

During engine operation it is desirable to determine the position of the piston 16 throughout its linear travel within the cylinder bore 14, for example, from bottom dead center (BDC) to top dead center (TDC). To this end, the system 10 may include a toothed crank wheel 24 and a crank sensor 26 positioned proximate to the crank wheel 24 to sense rotational movement of the crank wheel teeth. The crank sensor 26 outputs a crank signal 28 to a controller 30 indicative of a crank angle θ, which corresponds to the linear position of the piston 16, and a crank speed N.

The controller 30, such as an engine control module (ECM), may include a processor 32 or other control circuitry as should be evident to those in the art. The controller 30 and/or processor 32 may include memory 94, including non-volatile memory, such as electrically erasable programmable read-only memory (EEPROM) for storing one or more routines, thresholds and captured data. The one or more routines may be executed by the processor 32 to perform steps for determining a prior engine control parameter and scheduling a future engine control signal such that a future engine control parameter corresponds to a desired engine control parameter. FIG. 1 illustrates the processor 32 and other functional blocks as being part of the controller 30. However, it will be appreciated that it is not required that the processor 32 and other functional blocks be assembled within a single housing, and that they may be distributed about the engine 12 or vehicle. Signals to and from the controller 30 are indicated by solid arrowed lines in the figures.

One or more intake valve 32A and exhaust valve 32B are driven by one or more camshafts (see, e.g., FIGS. 3A and 3B at 184A, 184B) to regulate the flow of air into and exhaust from the combustion chamber 18. In one embodiment, actuators, such as cam phasers 34A, 34B, are respectively coupled to each of the intake valve 32A and the exhaust valve 32B, to provide further control of lift and/or duration of the valves beyond that provided by the camshaft profile. Example cam phasers are disclosed in U.S. Pat. No. 7,647,604, entitled "Variable Cam Phaser Apparatus," and European Patent Publication No. EP 2194241 entitled "Variable Cam Phaser," both of which are incorporated herein by reference in their entirety. The cam phasers 34A, 34B are controlled by a signal from a valve control 36.

A fuel injector 38 is configured to dispense fuel 40 in accordance with an injector control signal from by an injector driver 42. Example fuels include naphtha, kerosene, diesel, or gasoline; however, other fuels may be used. The fuel injector 30 controls delivery of fuel 40 to the combustion chamber 18 from a fuel pump 44 and a fuel spill valve, for example, controlled by a fuel pressure control 46.

Desired operation of a GDCI engine relies upon achieving a distribution of desired fuel/air ratio, or equivalence ratio φ, unlike typical internal combustion engines. Unlike typical internal combustion engines, a GDCI engine controls in-cylinder conditions to achieve autoignition of the fuel, rather than relying on external ignition sources such as a spark plug or a glow plug. Unlike typical diesel engines which utilize locally rich combustion via a diffusion flame, GDCI utilizes a progressive autoignition process of a distribution of equivalence ratios varying from lean to slightly rich at the moment of start of combustion. The fuel injection profile of a GDCI engine includes one or more injection events intended to deliver partially premixed fuel to the combustion chamber 18, rather than a homogenous air/fuel mixture as is done in Homogeneous Charge Compression Ignition (HCCI) engines, for example.

Controllable aspects of the fuel injection profile may include how quickly or slowly the fuel injector 38 is turned on and/or turned off, a fuel rate of fuel 40 dispensed by the fuel injector 38 while the fuel injector 38 is on, the initiation timing and duration of one or more fuel injections as a function of engine crank angle θ, the number of fuel injections dispensed to achieve a combustion event, and/or the pressure at which fuel is supplied to the fuel injector 38 by the fuel pump 44. Varying one or more of these aspects of the fuel injection profile may be effective to control autoignition. The engine 12 may also be equipped with an ignition source such as a spark plug 50 to assist with initial engine starting, if desired.

In order to achieve autoignition of the air/fuel mixture over essentially the entire speed-load range of the engine while achieving exceptional fuel consumption, noise, and emissions results, a multiple late-injection, partially mixed-mixture, low-temperature combustion process is used. Fuel 40 is injected by the fuel injector 38, where the fuel injector is fed by a fuel rail at a pressure in the range of 100 to 500 bar, late on the compression stroke using a number of distinct injection events to produce a certain state of controlled air/fuel mixture in the combustion chamber 18. The state of stratification in the combustion chamber 18 along with cylinder air charge properties controls the time at which autoignition occurs and the rate at which it proceeds. Depending on engine speed and load, single-injection, double-injection, triple-injection, quadruple-injection, quintuple-injection, or higher order strategies may be used. Fuel may be injected late on the compression stroke and generally in the range of 100 crank angle degrees before top dead center to 10 crank angle degrees after top dead center under most operating conditions, but other conditions may require injection timing outside this range.

The engine control system 10 includes one or more engine control devices operable to control an engine control parameter in response to an engine control signal, wherein the engine control parameter influences when autoignition initiates and the rate at which autoignition propagates through the combustion chamber 18. Aspects of the engine control system 10 will be more fully understood with reference to the air and exhaust gas paths of the engine 12, shown in FIG. 2.

Figure 2:
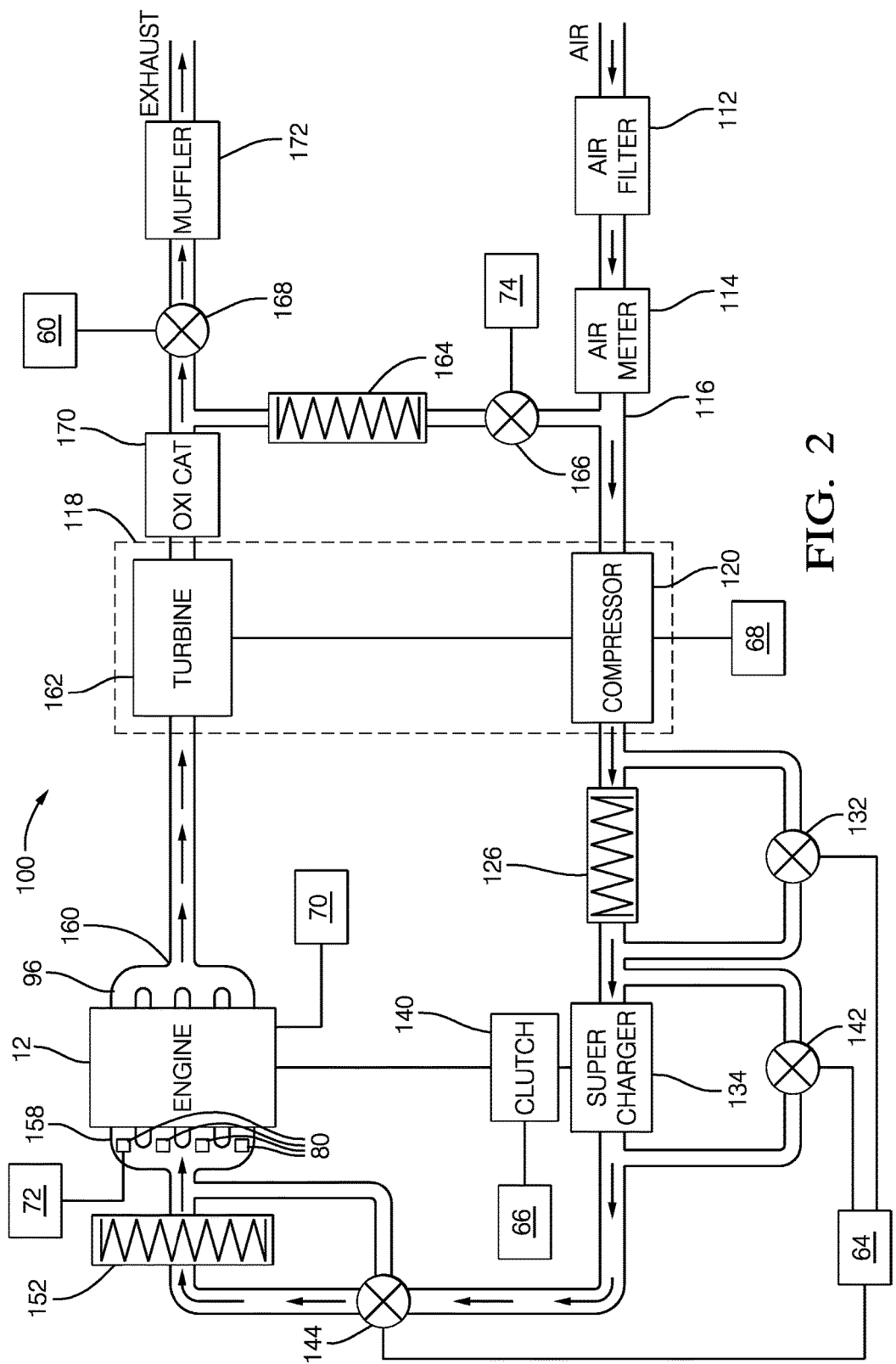
FIG. 2 is a schematic view of an embodiment of air and exhaust gas paths of the engine shown in FIG. 1.

FIG. 2 is a schematic view of a non-limiting embodiment of a gas path system 100 for providing air to and expelling exhaust from the combustion chamber 18 of the engine 12 in FIG. 1. More or fewer components than shown may be used, and the gas paths may be configured differently than illustrated.

Referring to FIG. 2, air passes through an air filter 112 and a mass airflow sensor (air meter) 114 into an air duct 116. The air duct 116 channels air into a compressor 120 of a turbocharger 118 in communication with a turbocharger control 68 (FIG. 1). Air is then channeled from the compressor 120 into a first charge air cooler 126. The first charge air cooler 126 is connected to a supercharger 134. A first charge air cooler bypass valve 132 is connected between an air inlet and an air outlet of the first charge air cooler 126 to selectively divert air around the first charge air cooler 126.

Air from first charge air cooler 126 is channeled to the air inlet of a supercharger 134, which is driven by the engine 12 through a controllable clutch 140 in communication with a supercharger control 66 (FIG. 1). A controllable supercharger bypass valve 142 allows air to bypass the supercharger 134. The air from the supercharger 134 and/or from the supercharger bypass valve 142 is channeled to a second charge air cooler bypass valve 144. The second charge air cooler bypass valve 144 selectively provides air to a second charge air cooler 152 and/or an air intake manifold 158 of the engine 12. An air valve control 64 (FIG. 1) is in communication with the first charge air cooler bypass valve 132, supercharger bypass valve 142 and second charge air cooler bypass valve 144 to coordinate the flow of air therethrough.

An air intake heater 80 is arranged in each of an intake runner of the air intake manifold 158. Each air intake heater 80 is in communication with a heater control 72 (FIG. 1) and is configured to heat air at the intake port of a corresponding cylinder 14 of the engine 12. Alternatively, a single heat source may be disposed in the air intake manifold 158 so as to heat air supplied to all of the intake ports of the engine 12.

With continuing reference to FIG. 2, following a combustion event, exhaust gas exits an exhaust manifold 96 through one or more exhaust ports 160 of the engine 12 and is channeled to the turbine 162 of the turbocharger 118. Exhaust gas exiting the turbine 162 passes through a catalytic converter 170. Upon exiting the catalytic converter 170, the exhaust gas can follow one of two paths. A portion of the exhaust gas may pass through an EGR cooler 164 and an EGR valve 166 that is controlled by an EGR driver 74 (FIG. 1), to be reintroduced into the intake air stream at air duct 116. The remainder of the exhaust gas that is not recirculated through the EGR system passes through a backpressure valve 168, which is in communication with a backpressure control 60 (FIG. 1), and a muffler 172, to be exhausted out a tail pipe.

It will be appreciated from the foregoing description of FIG. 2 that some of the components in FIG. 2 affect the temperature and/or the pressure of the gas flowing through the component. For example the turbocharger compressor 120 and the supercharger 134 each increase both the temperature and the pressure of air flowing therethrough. The first charge air cooler 126, the second charge air cooler 152, and the EGR cooler 164 are each heat exchangers that affect the temperature of the gas (air or exhaust gas) flowing therethrough by transferring heat between the gas and another medium. In one embodiment, the other heat transfer medium is a liquid coolant provided in coolant system 63 (FIG. 1), which includes a high temperature cooling loop and/or a low temperature cooling loop regulated by a coolant control 62 (FIG. 1). In an alternate embodiment, a gaseous coolant may be used in lieu of a liquid coolant. An oil control 70 (FIGS. 1 and 2) may also be used to regulate the flow of oil, and therefore the oil temperature, through the engine 12.

Returning to FIG. 1, the engine control system 10 includes a combustion sensing device 82, such as a pressure sensor, arranged in the combustion chamber 18. The combustion sensing device 82 provides a signal to a combustion feedback module 84 that is indicative of in-cylinder conditions within the combustion chamber 18, such combustion characteristics and/or pre-combustion conditions. Another example combustion sensing device 82 detects heat release. Other devices that may be useful for indicating some aspect of the combustion process are a knock sensor or an ion sensor. The combustion detection device 82 may be any one of the exemplary sensors, other suitable sensor, or a combination of two or more sensors arranged to provide an indication of in-cylinder conditions.

The controller 30 has other modules relating to desired engine operation, including target Indicated Mean Effective Pressure (IMEP) 86, combustion parameter targets 88, and steady state control targets 90. Combustion parameter targets 88 may correspond to empirically determined values relating to the combustion process within the combustion chamber 18 during various engine operating conditions. Although not shown, the engine control system 10 may include additional sensors or estimators to determine temperature and/or pressure and/or oxygen concentration (for example, in-cylinder conditions within the combustion chamber 18) and/or humidity at locations within the air intake system and/or the engine exhaust system, which may be provided as actual engine states 92.

Figure 3A:
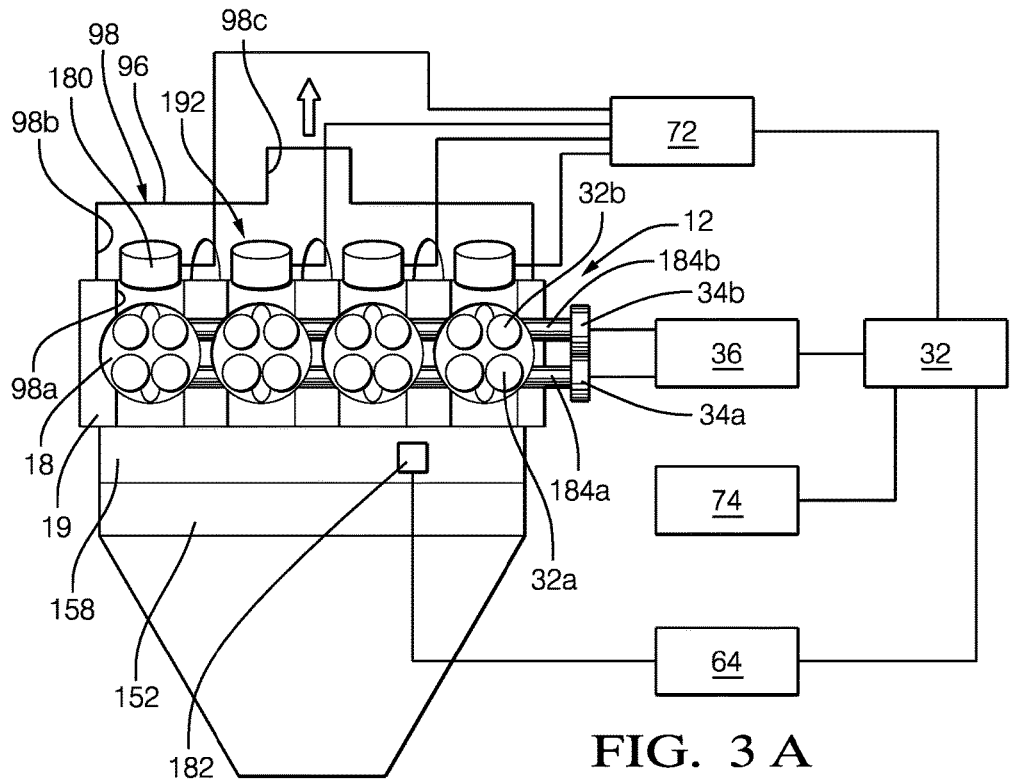
FIG. 3A is a schematic view of a portion of the exhaust gas path with electrically heated catalysts arranged at a first location in an exhaust port.
Figure 3B:
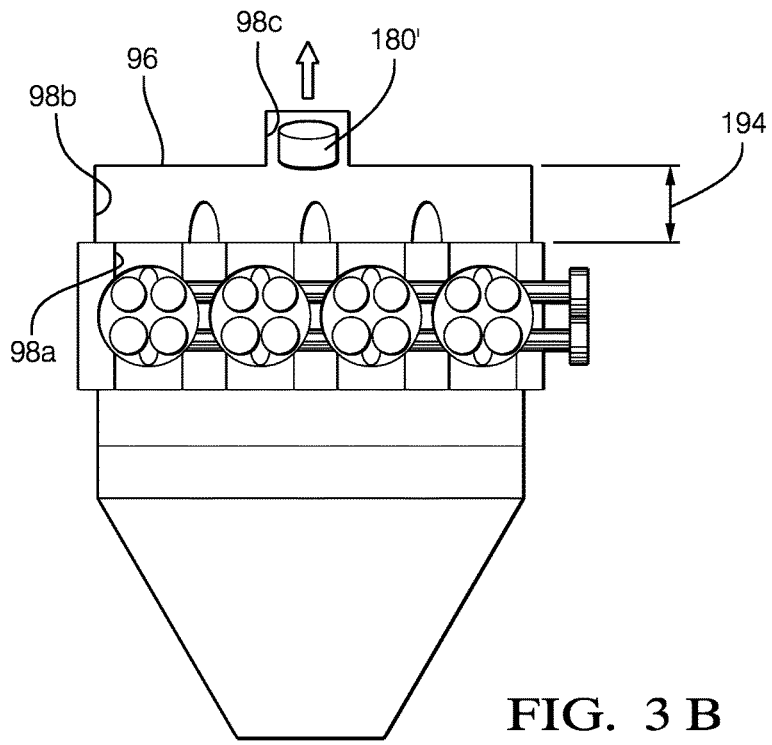
FIG. 3B is a schematic view of a portion of the exhaust gas path with an electrically heated catalyst arranged at a second location in an exhaust port.

A portion of the engine control system is shown in more detail in FIG. 3A. The combustion chamber 18 is configured to provide an in-cylinder combustion condition including a temperature, which is measured or estimated. In one example, the temperature is inferred using, in part, a temperature sensor 182 arranged in an intake manifold 158 arranged downstream relative to the flow direction and from the second charge air cooler 152.

An exhaust port 98 extends from each combustion chamber 18. In one example, the exhaust manifold 96 is provided by a casting, for example, cast iron, that has multiple exhaust runners 98B converging to a collector 98C. Other materials and/or configurations can also be used, such as fabricated cast stainless steel, aluminum with inner liner and/or an exhaust manifold with watercooling. Although the exhaust manifold can be provided by welded mandrel bent components, high volume production exhaust manifolds are typically cast. Exhaust components, such as the catalyst housing, exhaust pipes, and mufflers are typically tubular, seam-welded sheet metal components and are not cast. The exhaust manifold casting includes at least one flange 188 secured to a terminal end 186 of the exhaust runners 98B, for example, integral to the casting if the exhaust manifold is cast. The flange 188 includes holes configured to receive fasteners 190 to secure the exhaust manifold 96 to a cylinder head 19.

Cylinder head exhaust ports 98A (see also FIG. 1), which are provided in the cylinder head 19, and the exhaust runners 98B and collector 98C, which are provided by a cavity 192 in the exhaust manifold 96, together provide the exhaust ports 98. As shown in FIG. 1, the exhaust valve 32B is arranged in the cylinder head exhaust port 98a.

Intake and exhaust camshafts 184A, 184B cooperate respectively with the intake and exhaust valves 32A, 32B in, for example, an overhead arrangement to open and close the valves in a synchronized fashion during engine operation. The cam phasers 34A, 34B can vary the opening and closing of the valves from the timing provided by the camshaft lobe profiles. In one example, the exhaust cam phaser 34B is used to open the exhaust valves 34B during the intake stroke of the piston to provide internal EGR or rebreath, which enables exhaust gases in the exhaust port 98 to reenter the combustion chamber 18.

Catalysts are used in the exhaust gas path to reduce emissions. A catalyst tends to operate more efficiently once a threshold temperature has been reached, referred to as "light-off." So emissions can be higher until the engine approaches operating temperature and the catalyst reaches light-off. Using rebreath during initial cold start is not useful because hot exhaust gases are needed. For GDCI engines, this is especially problematic since the temperatures are low during cold operation.

To address the above challenges, an electrically heated catalyst 180 is arranged in close proximity to the combustion chamber 18. One such type of catalyst is available from Emitec under the tradename METALIT. The electrically heated catalyst can provide 3600 W of heat in about 1 second with a 12 volt source, depending on the design configuration. In the example shown in FIG. 3A, the catalyst 180 is arranged in each of the exhaust runners 98B. The catalyst 180 can be heated independently or collectively. In order for the catalyst 180 to be effective during the rebreath condition, the catalyst 180 should be at a location where the exhaust gases heated by the catalyst 180 can be re-ingested into the combustion chamber 18 during the intake stroke. If the catalyst 180 is located too far from the combustion chamber 18 (where catalysts are typically located), only unheated exhaust gases will be rebreathed into the combustion chamber, which would significantly undermine the rebreathing.

The combustion chamber 18 has a combustion volume. In view of the above, in one example, the exhaust port 98 has a portion with an exhaust port volume that is less than or equal to the combustion volume. The catalyst 180 is arranged in the exhaust port volume such that the exhaust port volume within which the catalyst 180 is located adjoins the combustion volume. In one embodiment, this places the catalyst 180 within the exhaust runners 98B. Referring to another configuration shown in FIG. 3B, the catalyst 180' may be arranged in the collector 98C and still be at a distance 194 that is close enough to the combustion chamber 18.

In one example, the catalytic converter 170 (FIG. 2) may be omitted if sufficient emissions control is achieved by the catalyst 180.

Figure 4:
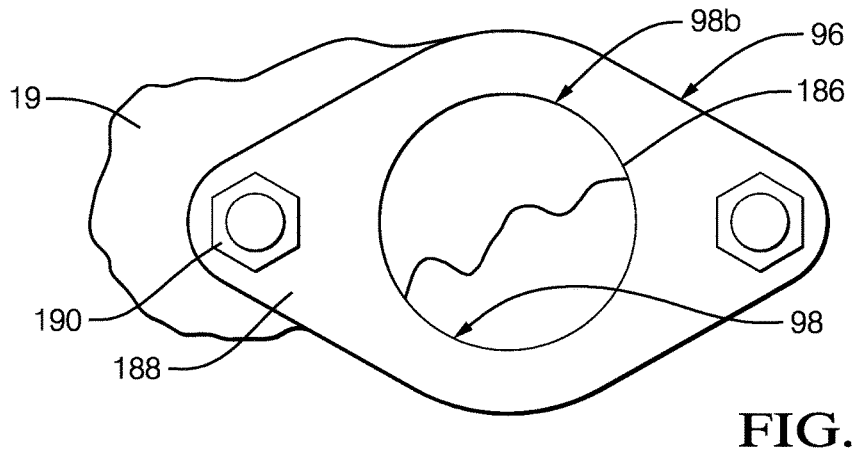
FIG. 4 illustrates an exhaust manifold flange used to secure an exhaust manifold to a cylinder head.
Figure 5:
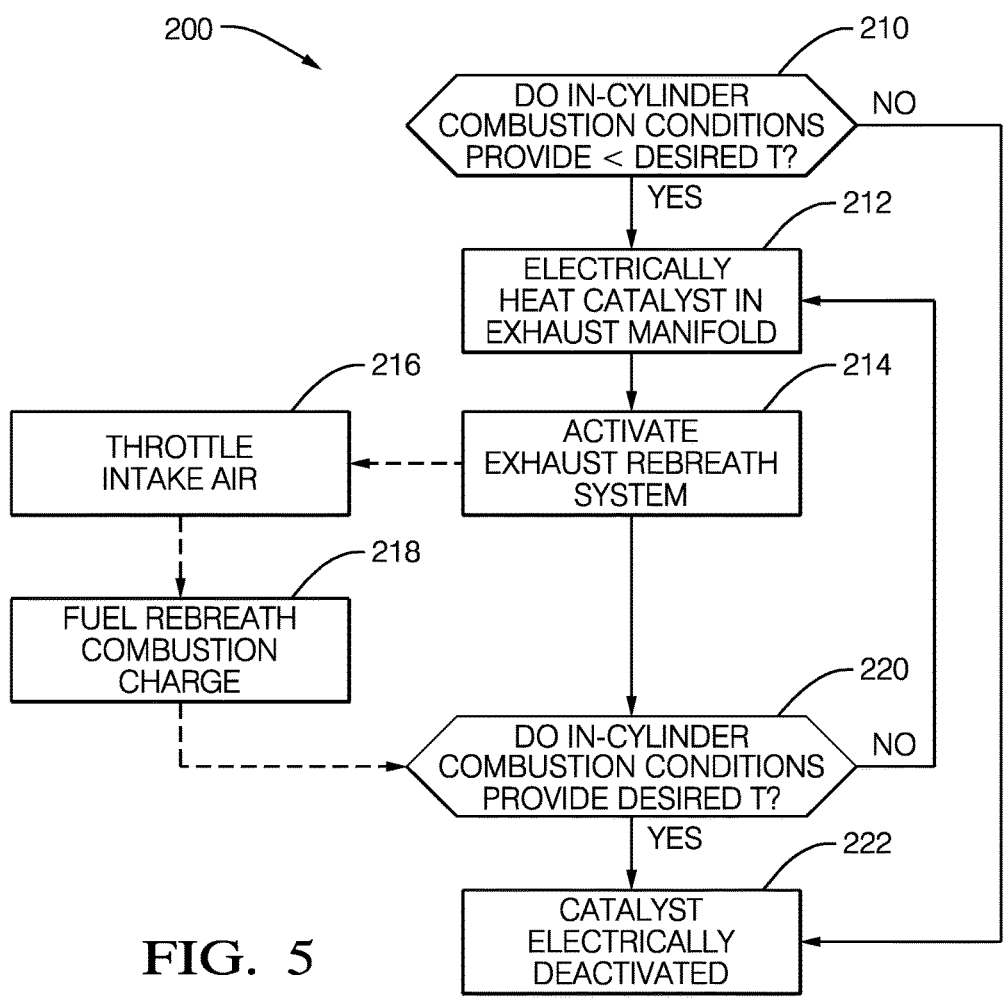
FIG. 5 is a flow chart depicting an example method of controlling an in-cylinder combustion charge air temperature and reducing emissions.

The controller 30 is in communication with the sensor 182 and the exhaust cam phaser 34B. Referring to FIG. 4, a method 200 of controlling an in-cylinder combustion charge air temperature includes determining whether in-cylinder combustion conditions provide less than a desired temperature (block 210). The controller 30 is configured to provide a first command to the electric heater of the catalyst 180 (block 212) and a second command to the cam phaser 34B (block 214) to rebreath the heated exhaust into the combustion chamber 18 in response to the detected temperature being below a desired temperature. The catalysts 180 are activated for a few seconds prior to cranking the engine at start up.

Up to around 60%-70% rebreath can be used as soon as possible on start up, for example. The intake air can be throttled (block 216) by the second charge air cooler bypass valve 144 to reduce the amount of intake air entering the combustion chamber and instead use more rebreath, which can more rapidly heat the gases used in the combustion chamber 18. Additionally, the combustion chamber 18 may not be fueled until a threshold in cylinder temperature is reached (block 218). The catalyst may be heated and exhaust gases rebreathed until the desired in-cylinder temperatures are reached (block 220). Once the desired in-cylinder temperatures are reached, the catalyst need not be electrically heated if light-off has been achieved (block 222).

Providing an electrically heated catalyst in the exhaust port improves catalyst light-off since there is very little structure that can act as a heat sink between the combustion chamber and the catalyst. Fast light-off reduces hydrocarbons and carbon monoxide emissions, in particular, when engine temperatures are low. The catalysts may be particularly effective as the rebreathed exhaust gas will pass through the catalysts multiple times. Moreover, increasing the temperature of the exhaust gases raises the temperature of any rebreathed gases, which helps the GDCI engine reach operating temperature more quickly.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An engine control system comprising:
    a combustion chamber configured to provide an in-cylinder combustion condition including a temperature;
    an exhaust port in fluid communication with the combustion chamber;
    a catalyst is arranged in the exhaust port and includes an electric heater;
    an exhaust valve is arranged in the exhaust port;
    an actuator is operatively coupled to the exhaust valve and is configured to selectively control a flow of exhaust into the combustion chamber during a rebreath condition;
    at least one sensor configured to detect the temperature; and
    a controller is in communication with the sensor and the actuator, the controller is configured to provide a first command to the electric heater and a second command to the actuator to rebreath heated exhaust flowing into the combustion chamber in response to the detected temperature being below a desired temperature.

2. The engine control system according to claim 1, comprising a cylinder head supporting the exhaust valve, the exhaust port arranged in the cylinder head.

3. The engine control system according to claim 2, comprising an exhaust manifold, the exhaust port arranged in the exhaust manifold, and the catalyst is arranged in the exhaust manifold.

4. The engine control system according to claim 3, wherein the exhaust manifold is cast iron.

5. The engine control system according to claim 3, wherein the exhaust manifold is secured to the cylinder head.

6. The engine control system according to claim 1, comprising multiple combustion chambers that each include a corresponding exhaust port, the exhaust ports converging to a collector, and the catalyst arranged in each of the exhaust ports.

7. The engine control system according to claim 1, comprising multiple combustion chambers that each include a corresponding exhaust port, the exhaust ports converging to a collector, and the catalyst arranged in the collector.

8. The engine control system according to claim 1, comprising a camshaft operatively connected to the exhaust valve to mechanically move the exhaust valve along an operating profile between a closed position and opened positions.

9. The engine control system according to claim 8, wherein the actuator includes a cam phaser coupled to the camshaft and configured to vary movement of the exhaust valve from the operating profile during the rebreath condition.

10. The engine control system according to claim 1, wherein the combustion chamber has a combustion volume, and the exhaust port has an exhaust port volume that is less than or equal to the combustion volume, the catalyst arranged in the exhaust port volume adjoining the combustion chamber.

11. The engine control system according to claim 1, wherein the temperature is measured.

12. The engine control system according to claim 1, wherein the temperature is estimated.

13. A method of controlling an in-cylinder combustion charge air temperature, the method comprising the steps of:
    detecting an undesirably low in-cylinder charge air temperature;
    heating exhaust gases in close proximity to a combustion chamber in response to the detecting step; and
    rebreathing the heated exhaust gases into the combustion chamber to increase the in-cylinder charge air temperature.

14. The method according to claim 13, wherein the detecting step is one of measuring or estimating the undesirably low in-cylinder charge air temperature.

15. The method according to claim 13, wherein the combustion chamber has a combustion volume, and the close proximity is arranged within an exhaust volume that is less than or equal to the combustion volume, the exhaust volume adjoining the combustion chamber, the heating step occurs within the exhaust volume.

16. The method according to claim 15, wherein the heating step is performed by electrically heating a catalyst.

17. The method according to claim 13, wherein the rebreathing step occurs during an intake stroke.

* * * * *